United States Patent [19]
Hood

[11] Patent Number: 5,524,378
[45] Date of Patent: * Jun. 11, 1996

[54] FISHING LURE WITH RATTLE MEANS

[76] Inventor: Robin C. Hood, 3244 Harrow Pl., Charlotte, N.C. 28205

[*] Notice: The portion of the term of this patent subsequent to May 31, 2015, has been disclaimed.

[21] Appl. No.: 374,865

[22] Filed: Jan. 19, 1995

[51] Int. Cl.$^6$ .................................................. A01K 85/01
[52] U.S. Cl. ........................................ 43/42.31; 43/44.81
[58] Field of Search ............................ 43/42.31, 42.38, 43/44.81, 44.2, 42.28, 42.3, 42.24

[56] References Cited

U.S. PATENT DOCUMENTS

| 3,323,248 | 6/1967 | Sutryn | 43/42.28 |
| 3,550,306 | 12/1970 | Heitman | 43/44.2 X |
| 5,001,856 | 3/1991 | Gentry | 43/42.37 X |
| 5,038,513 | 8/1991 | Hardin | 43/42.38 X |
| 5,230,178 | 7/1993 | Dillard | 43/44.8 |
| 5,231,786 | 8/1993 | Hughes | 43/44.81 X |
| 5,426,886 | 6/1995 | Stanley | 43/42.31 |

OTHER PUBLICATIONS

Tournament Lures, "WEAPON," one page only.
Base Pro Shops, "SPRING SALE CATALOG," 1994, pp. 58 and 59.
Bass Pro Shops 1995 Catalog, "Triple Rattleback Jig", p. 190, Feb. 1995.

Primary Examiner—Jeanne M. Elpel
Attorney, Agent, or Firm—W. Thad Adams, III

[57] ABSTRACT

A fishing lure includes a hook having an elongate shank, a weighted head connected to the shank, and a barbed end. An arm is connected to the head of the hook, and includes a free end thereof extending outwardly from the hook. A chamber is connected to the free end of the arm. A plurality of steel shot are contained in the chamber for producing a rattling noise as the fishing lure is drawn through the water.

28 Claims, 4 Drawing Sheets

FISHING LURE WITH RATTLE MEANS

TECHNICAL FIELD AND BACKGROUND OF THE INVENTION

This invention relates to a fishing lure. The invention is commonly known in the art as a jig, and the particular jig disclosed below is intended to simulate the clicking sound, physical appearance, and movement of a crawfish as the jig is drawn through the water on a fishing line. The invention is particularly useful for catching freshwater fish, such as large-mouth bass, crappie, carp, and catfish.

According to some prior art jigs, one or more rattle chambers containing loose pellets are connected or formed to the head of the hook or to the shank of the hook, and thus create a rattling noise as the jig is drawn though the water. The rattling noise simulates the clicking sound made by crawfish, and is intended to attract fish. However, since the chambers are directly formed to the hook, the jig does not resemble the physical appearance of a crawfish. Moreover, because the jig is relatively bulky and the chambers are rigidly connected to the hook, the jig is more prone to becoming trapped between rocks or in heavy brush.

The present invention overcomes these and other problems of the prior art by providing a jig with flexible arms, and rattle chambers connected to the arms. The invention resembles the physical appearance of a crawfish, and creates a relatively loud rattling noise when drawn through the water. Since the chambers are allowed to shake and move relative to the hook, the rattling noise created by the pellets is generally louder than that created by prior art jigs. The invention is less likely to become trapped between rocks, and because the chambers reside outside the bite of the hook, they will not interfere with the hooking of the fish.

SUMMARY OF THE INVENTION

Therefore, it is an object of the invention to provide a fishing lure for simulating the sound, physical appearance, and movement of a crawfish.

It is another object of the invention to provide a fishing lure which creates a relatively loud rattle noise as the lure is drawn through the water on a fishing line.

It is another object of the invention to provide a fishing lure which will not readily become trapped between rocks or in heavy brush.

It is another object of the invention to provide a fishing lure which will not interfere with the hooking of a fish.

It is another object of the invention to provide a fishing lure which includes a skirt that is relatively easy to remove and replace.

It is another object of the invention to provide a fishing lure which includes a skirt that may be safely removed and replaced without substantial risk of injury.

These and other objects of the present invention are achieved in the preferred embodiments disclosed below by providing a fishing lure. The fishing lure includes hook means including a weighted head and a barbed end for catching fish. An arm means is connected to the hook means, and includes a free end thereof extending outwardly from the hook means. A chamber is connected to the free end of the arm means. Rattle means are contained in the chamber for producing a rattling noise as the fishing lure is drawn through the water.

According to one preferred embodiment of the invention, the arm means is a flexible, monofilament line.

Preferably, the monofilament line is nylon or polycarbonate.

According to another preferred embodiment of the invention, the rattle means includes a plurality of steel shot contained in the chamber.

Preferably, the rattle means includes between 8–10 steel shot contained in the chamber.

According to yet another preferred embodiment of the invention, the chamber is elongate and cylindrical.

Preferably, the chamber is formed of a polycarbonate material.

According to yet another preferred embodiment of the invention, an outwardly extending weed guard is connected to the hook means for shielding the barbed end of the hook means from weeds, brush, twigs, and other objects located near the ground as the fishing lure is drawn through the water.

According to yet another preferred embodiment of the invention, a colorful skirt is removably attached to the hook means for attracting fish.

According to yet another preferred embodiment of the invention, an elastic collar removably attaches the skirt to the hook means.

According to yet another preferred embodiment of the invention, the hook means includes an elongate shank, and the weighted head is connected to the shank for submerging the lure.

According to one preferred embodiment of the invention, the head of the hook means is tapered.

According to another preferred embodiment of the invention, the head of the hook means is relatively flat and bulbous.

According to yet another preferred embodiment of the invention, the length of the arm means is equal to or greater than the length of the head of the hook means.

According to yet another preferred embodiment of the invention, the hook means includes an eye for receiving a free end of fishing line for attaching the lure to the fishing line.

According to yet another preferred embodiment of the invention, the chamber is located on a side of the hook means opposite the barbed end of the hook means, and resides in substantially unobstructing relation to the barbed end of the hook means.

According to another preferred embodiment of the invention, the fishing lure includes hook means including an elongate shank, a weighted head connected to the shank, and a barbed end for catching fish. First and second outwardly extending and diverging arm means are connected to the head of the hook means, and include respective free ends thereof. First and second chambers are connected to respective free ends of the first and second arm means. First and second rattle means are contained in respective first and second chambers for producing a rattling noise as the fishing lure is drawn through the water. An outwardly extending weed guard is connected to the head of the hook means for shielding the barbed end of the hook means from weeds, brush, twigs, and other objects located near the lake bed as the fishing lure is drawn through the water. A colorful skirt is removably attached to the hook means for attracting fish.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
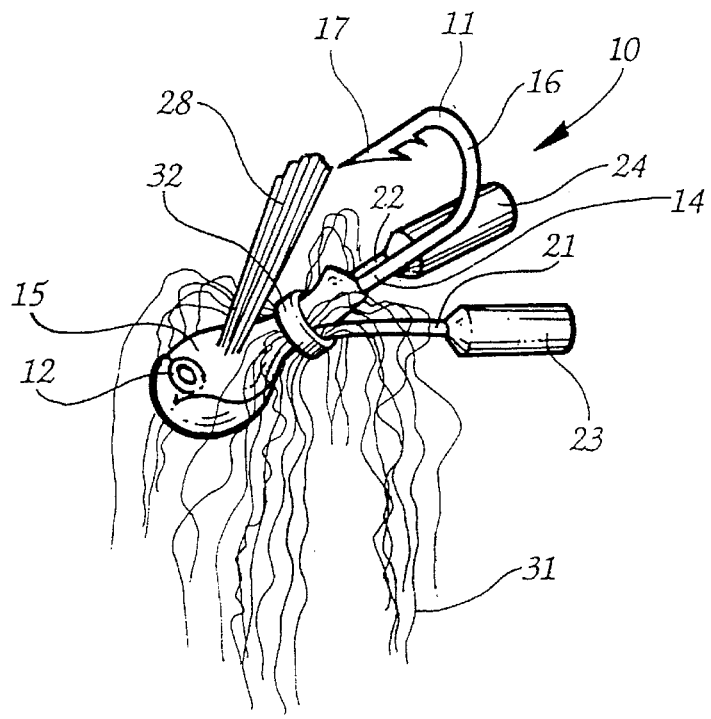
FIG. 1 is a perspective view of the fishing lure according to one preferred embodiment of the invention.

Referring now specifically to the drawings, a fishing lure according to the present invention is illustrated in FIG. 1 and shown generally at reference numeral 10. The fishing lure 10 is commonly known in the art as a jig, and is particularly intended to resemble the physical appearance, sound, and movement of a crawfish as the lure 10 is drawn through the water on a fishing line. The lure 10 is particularly useful for catching freshwater fish, such as large-mouth bass, crappie, carp, and catfish.

Figure 2:
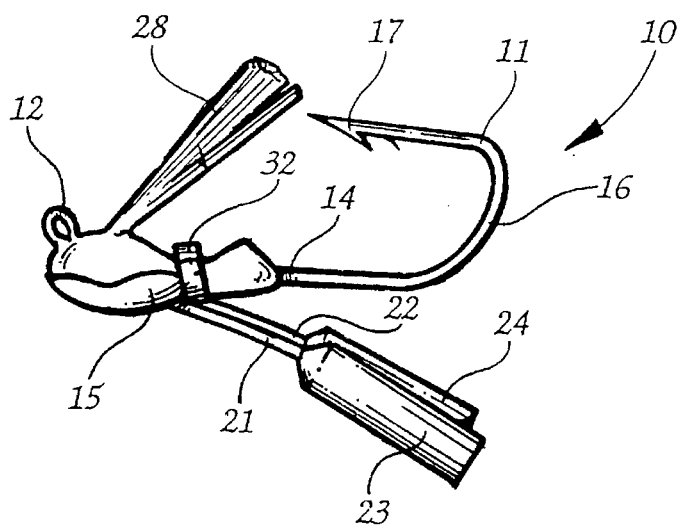
FIG. 2 is a side elevational view of the fishing lure shown in FIG. 1 with the skirt removed for clarity.
Figure 3:
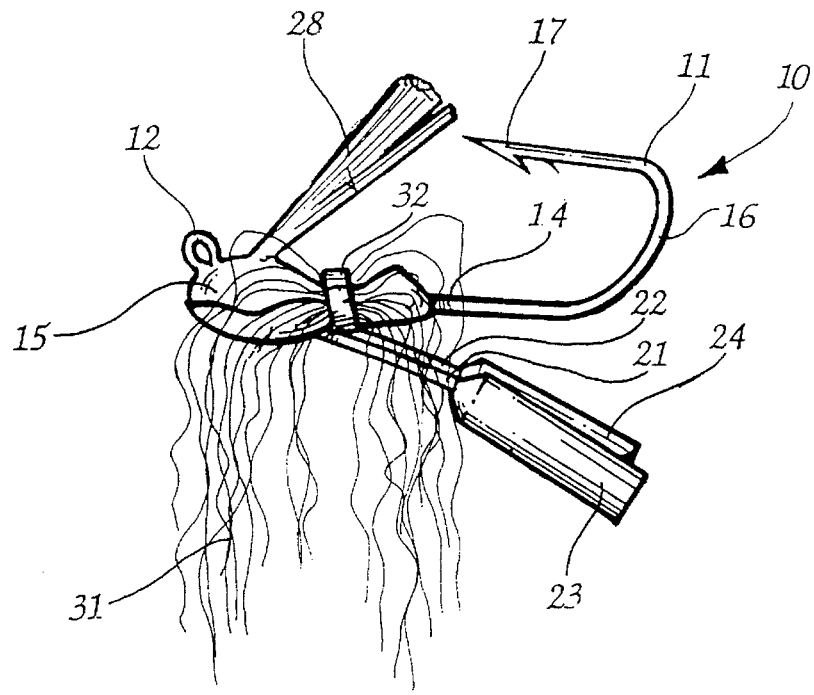
FIG. 3 is a side elevational view of the fishing lure with the skirt attached.
Figure 4:
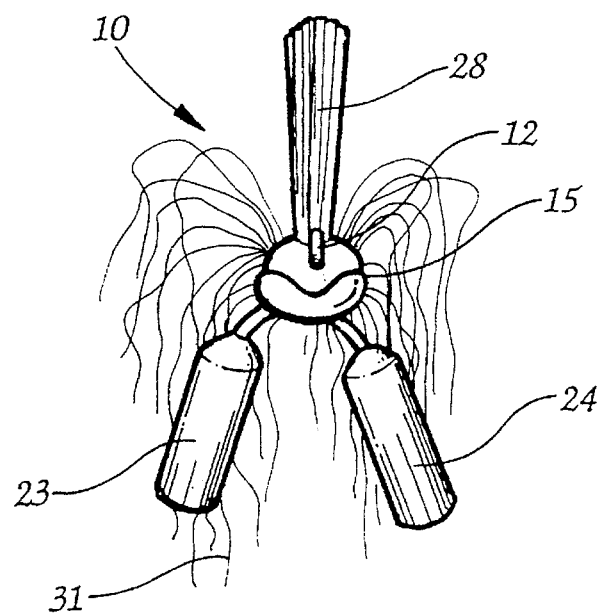
FIG. 4 is a front end view of the fishing lure with the skirt attached.
Figure 5:
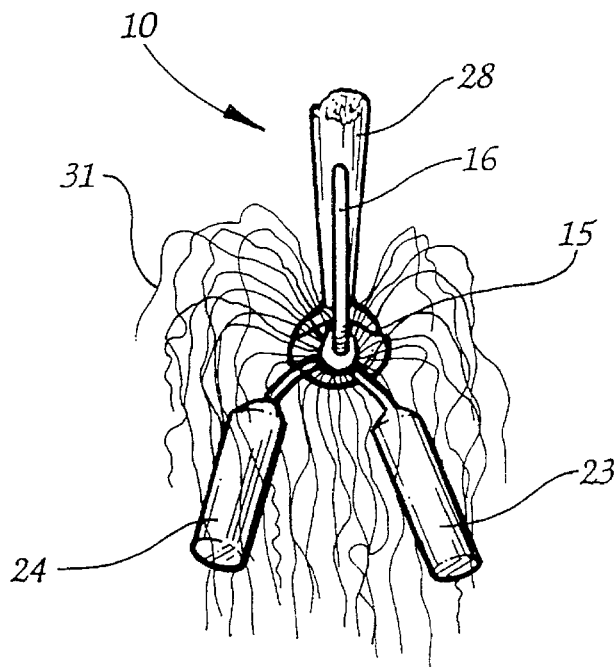
FIG. 5 is a back end view of the fishing lure with the skirt attached.
Figure 6:
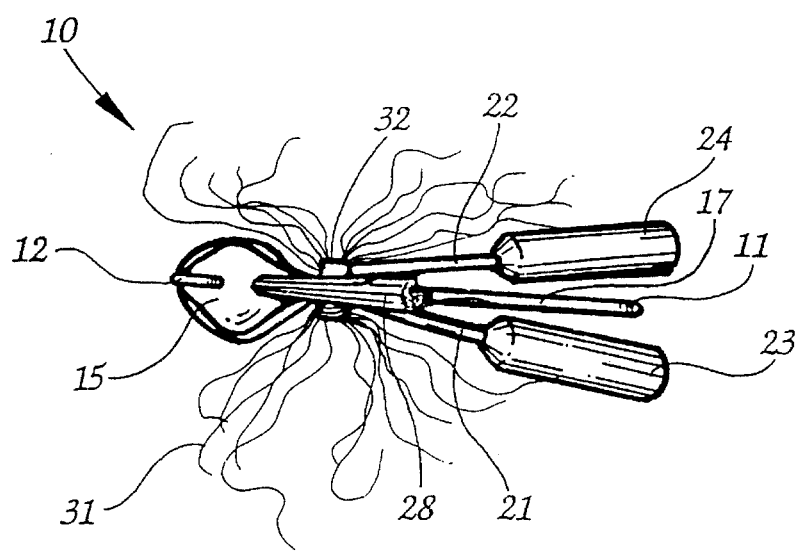
FIG. 6 is a top plan view of the fishing lure with the skirt attached.
Figure 7:
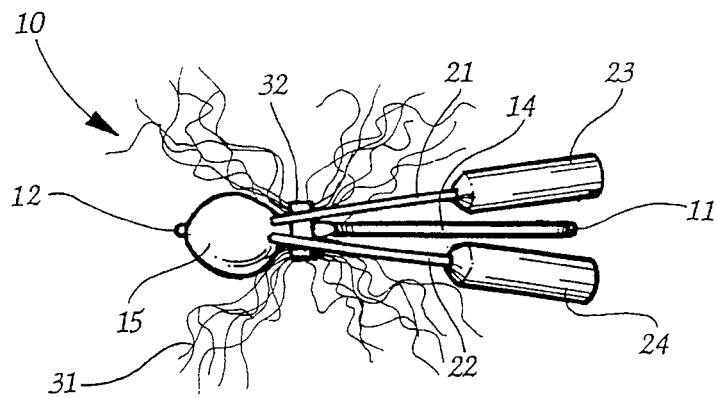
FIG. 7 is a bottom plan view of the fishing lure with the skirt attached.

As best shown in FIG. 2, the fishing lure 10 includes a hook 11 having an eye 12 for receiving a threaded end of fishing line (not shown), an elongate shank 14, a weighted head 15 connected to the shank 14, a bend 16, and a barbed end 17 for piercing the mouth of a fish. The weighted head 15 is preferably formed of lead, and may be either aerodynamic or bulbous shaped. The bite of the hook 11 is defined by the general area surrounding the barbed end 17 and bend 16. The hook 11 may be any other preferred type and style commonly known and used in the art.

The hook 11, eye 12, shank 14, head 15, bend 16, and barbed end 17 are collectively referred to herein as "hook means". The hook means may include fewer than all of these elements.

As shown in FIGS. 1–7, first and second arms 21 and 22 are connected to the head 15 of the hook 11, and include respective free ends extending outwardly from the head 15 in a direction opposite the curve of the bend 16. Preferably, each arm 21 and 22 is formed of a flexible polycarbonate monofilament. Alternatively, heavy nylon monofilament, such as that used for 60 lb. or 80 lb. fishing line, may be used to form the arms 21 and 22.

First and second elongate and cylindrical chambers 23 and 24 are connected to respective free ends of the arms 21 and 22, and simulate the appearance of crawfish claws. Each chamber 23 and 24 is preferably formed of a polycarbonate material, and includes between 8 and 10 small steel shot. The ends of each chamber 23 and 24 are plugged or sealed to contain the shot within the chambers 23 and 24. The steel shot create a rattling noise as the chambers 23 and 24 contact the lake bed, rocks, and other objects.

The chambers 23 and 24 reside outside of the bite of the hook 11, and preferably drag along the river or lake bed as the fishing lure 10 is drawn through the water. The length of each cylindrical chamber 23 and 24 is preferably about 3 to 5 times the diameter. The respective arms 21, 22 and chambers 23, 24 are collectively referred to herein as "arm assemblies."

A weed guard 28 is connected to the head 15 of the hook 11, and extends outwardly from the head 15 to shield the barbed end 17 of the hook 11 from weeds, brush, twigs, and other objects located on or near the lake bed. Preferably, the weed guard 28 is formed of a bundle of closely-spaced segments of monofilament nylon bristle.

In addition, a colorful skirt 31 may be attached to the fishing lure 10 for creating life-like action as the lure 10 is drawn through the water. The skirt 31 is preferably made of a relatively flimsy material, such as that manufactured by DuPont and sold under the trademark Lumaflex™. Alternatively, the skirt 31 may be formed of silicone, living rubber, or hair. The skirt 31 is heat resistant to prevent melting, and may be crawfish-scented to further attract fish.

According to one embodiment, the skirt 31 is removably attached to the lure 10 by an elastic rubber collar 32. To apply the skirt 31 to the lure 10, the user wraps the collar 32 around the skirt 31 and then pushes the collar 32 and skirt 31 over the barbed end 17 of the hook 11, around the bend 16, and upwardly along the shaft 14 of the hook 11 to the base of the head 15. The collar 32 is sufficiently resilient to permit relatively easy and safe removal and attachment of the skirt 31, while securely holding the skirt 31 to the lure 10.

Figure 8:
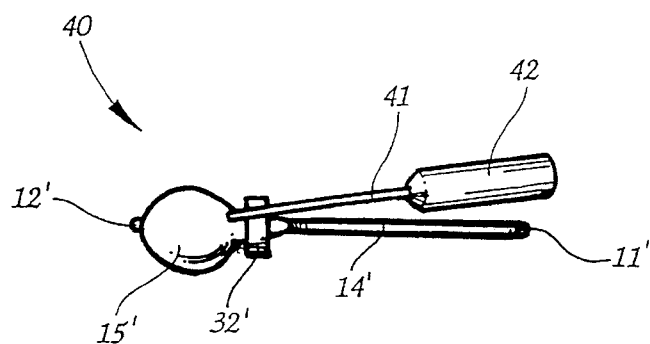
FIG. 8 is a bottom plan view of the fishing lure according to a second preferred embodiment of the invention, and with the skirt removed.

In an alternative embodiment shown in FIG. 8, the fishing lure 40 includes only one flexible arm 41 and chamber 42. Like elements described above and shown in FIG. 8 are indicated in prime notation.

Figure 9:
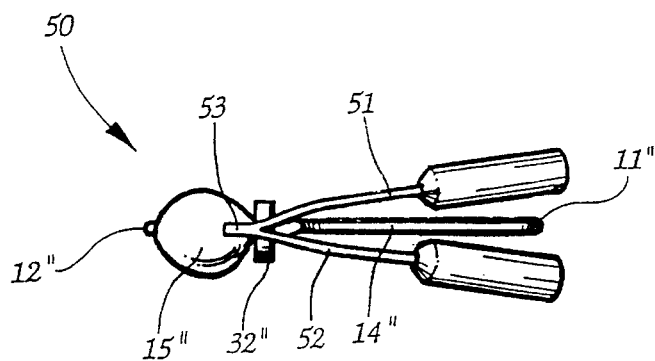
FIG. 9 is a bottom plan view of the fishing lure according to a third preferred embodiment of the invention, and with the skirt removed.

Yet another preferred embodiment of the fishing lure 50 is shown in FIG. 9. Like elements described above and shown in FIG. 9 are indicated in double prime notation. According to this embodiment, the arms 51 and 52 of the fishing lure 50 are integrally molded together of a polycarbonate or Lexan™ material to form a wishbone-shaped structure with the center section 53 of the structure being permanently embedded in the head 15" of the hook 11".

In addition, the fishing lure may include as many as three or more arms and chambers. The fishing lure may also be used without the skirt and/or weed guard.

A fishing lure is described above. Various details of the invention may be changed without departing from its scope. Furthermore, the foregoing description of the preferred embodiment of the invention is provided for the purpose of illustration only and not for the purpose of limitation—the invention being defined by the claims.

I claim:

1. A fishing lure for being drawn through a body of water, comprising:
    (a) hook means including a weighted head connected thereto, and a barbed end;
    (b) arm means comprising a flexible, monofilament line connected to said hook means, and including a free end thereof extending outwardly from said hook means;
    (c) a chamber formed of a hard, rigid material connected to the free end of said arm means, and comprising an interior and an exterior, the exterior being substantially exposed to the water; and (d) rattle means contained in said chamber and striking the interior of said chamber for producing a rattling noise as said fishing lure is drawn through the water.

2. A fishing lure according to claim 1, wherein said monofilament line is selected from the group consisting of nylon and polycarbonate.

3. A fishing lure according to claim 1, wherein said rattle means comprises a plurality of steel shot contained in said chamber.

4. A fishing lure according to claim 1, wherein said rattle means comprises between 8–10 steel shot contained in said chamber.

5. A fishing lure according to claim 1, wherein said chamber is elongate and cylindrical.

6. A fishing lure according to claim 5, wherein said chamber is formed of a polycarbonate material.

7. A fishing lure according to claim 1, and including an outwardly extending weed guard connected to said hook means for shielding the barbed end of said hook means from weeds, brush, twigs, and other objects located near the ground as the fishing lure is drawn through the water.

8. A fishing lure according to claim 1, and including a colorful skirt removably attached to said hook means for attracting fish.

9. A fishing lure according to claim 8, and including an elastic collar for removably attaching the skirt to said hook means.

10. A fishing lure according to claim 1, wherein said hook means includes an elongate shank, and said weighted head is connected to the shank for submerging the lure.

11. A fishing lure according to claim 10, wherein the head of said hook means is tapered.

12. A fishing lure according to claim 10, wherein the head of said hook means is relatively bulbous.

13. A fishing lure according to claim 10, wherein the length of said arm means is equal to or greater than the length of the head of said hook means.

14. A fishing lure according to claim 1, wherein said hook means includes an eye for receiving a free end of fishing line for attaching the lure to the fishing line.

15. A fishing lure according to claim 1, wherein said chamber is located on a side of said hook means opposite the barbed end of said hook means, and resides in substantially unobstructing relation to the barbed end of said hook means.

16. A fishing lure for being drawn through a body of water, comprising:

(a) hook means including a weighted head and a barbed end;

(b) first and second arm means, comprising respective filaments, connected to said hook means, and including respective free ends thereof extending outwardly from said hook means, said first and second arm means diverging from each other as they extend outwardly from said hook means;

(c) first and second chambers formed of a hard, rigid material connected to respective free ends of said first and second arm means, and each of said chambers comprising an interior and an exterior, the exterior being substantially exposed to the water; and (d) first and second rattle means contained in respective first and second chambers and striking the interior of said chambers for producing a rattling noise as said fishing lure is drawn through the water.

17. A fishing lure according to claim 16, and including an outwardly extending weed guard connected to said hook means for shielding the barbed end of said hook means from weeds, brush, twigs, and other objects located near the ground as the fishing lure is drawn through the water.

18. A fishing lure according to claim 16, and including a colorful skirt removably attached to said hook means for attracting fish.

19. A fishing lure according to claim 18, and including an elastic collar for removably attaching said skirt to said hook means.

20. A fishing lure according to claim 16, wherein said hook means includes an elongate shank, and said weighted head is connected to the shank for submerging the lure.

21. A fishing lure for being drawn through a body of water, comprising:

(a) hook means including an elongate shank, a weighted head connected to the shank, and a barbed end;

(b) first and second outwardly extending and diverging arm means, comprising respective filaments, connected to the head of said hook means, and including respective free ends thereof;

(c) first and second chambers formed of hard, rigid material connected to respective free ends of said first and second arm means, each of said chambers having an exterior, the exteriors substantially exposed to the water;

(d) first and second rattle means contained in respective first and second chambers for producing a rattling noise as said fishing lure is drawn through the water;

(e) an outwardly extending weed guard connected to the head of said hook means for shielding the barbed end of said hook means from weeds, brush, twigs, and other objects located near the ground as the fishing lure is drawn through the water; and (f) a colorful skirt removably attached to said hook means for attracting fish.

22. An arm assembly for being attached to a fishing lure for being drawn through a body of water and comprising hook means including a barbed end and a weighted head, said arm assembly comprising:

(a) arm means comprising a flexible, monofilament line having a proximal end thereof adapted for being connected to the hook means, and a free end thereof for extending outwardly from the hook means; and (b) a chamber formed of a hard, rigid material connected to the free end of said arm means, and said chamber comprising an exterior for being substantially exposed to the water.

23. An arm assembly according to claim 22, and including rattle means contained in said chamber and striking an interior of said chamber for producing a rattling noise as said fishing lure is drawn through the water.

24. An arm assembly according to claim 22, wherein the proximal end of said arm means is permanently embedded in the weighted head of the hook means for attaching said arm means to the weighted head of the hook means.

25. An arm assembly for being attached to a fishing lure for being drawn through a body of water and comprising hook means including a barbed end and a weighted head, said arm assembly comprising:

(a) first and second arm means, comprising respective filaments, adapted for being connected to the hook means, and having respective free ends thereof for extending outwardly from the hook means, said first and second arm means diverging from each other as they extend outwardly from the hook means;

(b) first and second chambers formed of a hard, rigid material connected to the free ends of said first and second arm means, and each of said chambers comprising an interior and an exterior, the exterior being substantially exposed to the water; and (c) first and second rattle means contained in the first and second chambers and striking the interior of said chambers for producing a rattling noise as said fishing lure is drawn through the water.

26. An arm assembly according to claim 25, wherein said first and second arm means are integrally formed together, and include a single proximal end connected to the weighted head of the hook means.

27. An arm assembly according to claim 26, wherein the proximal end of said first and second arm means is permanently embedded in the weighted head of the hook means for attaching the first and second arm means to the hook means.

28. An arm assembly for being attached to a fishing lure for being drawn through a body of water and comprising hook means including a barbed end and a weighted head, said arm assembly comprising:

(a) first and second arm means, comprising respective filaments, adapted for being connected to the hook means, and having respective free ends thereof for extending outwardly from the hook means;

(b) said first and second arm means being integrally formed together, and including a single proximal end for being connected to the weighted head of the hook means;

(c) first and second chambers formed of a hard, rigid material connected to the free ends of said first and second arm means, and each of said chambers comprising an interior and an exterior, the exterior being substantially exposed to the water; and (d) first and second rattle means contained in the first and second chambers and striking the interior of said chambers for producing a rattling noise as said fishing lure is drawn through the water.

* * * * *